(12) United States Patent
Johannesson et al.

(10) Patent No.: US 12,738,387 B2
(45) Date of Patent: Sep. 15, 2026

(54) SYSTEMS AND METHODS FOR SIMULATING AN OPERATION OF ONE OR MORE AUTOMATED TOOLS WITHIN A NUCLEAR FACILITY

(71) Applicant: ATS Corporation, Cambridge (CA)

(72) Inventors: Mark Johannesson, Cambridge (CA); Wesley Hergert, Cambridge (CA)

(73) Assignee: ATS CORPORATION (CA)

( * ) Notice: Subject to any disclaimer, the term of this patent is extended or adjusted under 35 U.S.C. 154(b) by 416 days.

(21) Appl. No.: 18/469,716

(22) Filed: Sep. 19, 2023

(65) Prior Publication Data

US 2024/0006086 A1 Jan. 4, 2024

Related U.S. Application Data

(63) Continuation of application No. PCT/CA2022/050394, filed on Mar. 16, 2022.

(Continued)

(51) Int. Cl.
*G09B 19/24* (2006.01)
*G09B 9/00* (2006.01)

(Continued)

(52) U.S. Cl.
CPC ............ *G21C 17/001* (2013.01); *G09B 9/00* (2013.01); *G09B 19/24* (2013.01); *G21C 17/017* (2013.01)

(58) Field of Classification Search
CPC ...................................................... G21D 1/003
See application file for complete search history.

(56) References Cited

U.S. PATENT DOCUMENTS 6,033,226 A 3/2000 Bullen
2013/0187751 A1* 7/2013 Kawaguchi ............ G09B 25/02 340/5.6
2017/0025040 A1 1/2017 Maturana et al.

FOREIGN PATENT DOCUMENTS

CN 208335756 U * 1/2019
EP 1083576 A1 * 3/2001 ............ G21D 3/001

OTHER PUBLICATIONS

Sankar, B. et al., "3D Modelling of Fuel Handling System for PFBR Operator Training Simulator", International conference on fast reactors and related fuel cycles: next generation nuclear systems for sustainable development, Moscow (Russian Federation); Jun. 26-29, 2017.

(Continued)

*Primary Examiner* — Robert J Utama
(74) *Attorney, Agent, or Firm* — Valauskas Corder LLC

(57) ABSTRACT

A system and a method for simulating an operation of one or more automated tools within a nuclear facility. The system includes a communication component to provide access to one or more computing devices, one or more local controllers for processing command requests from the one or more computing devices for the one or more automated tools, and a processor in communication with the communication component and the one or more local controllers. The local controllers may be programmable logic controllers. The method includes using the local controllers for processing command requests received from the computing devices to generate process values for the one or more automated tools, and operating a processor use the process values to animate a three-dimensional model and generate one or more views of the animation of the three-dimensional model to be displayed at one or more computing devices.

20 Claims, 6 Drawing Sheets

Related U.S. Application Data

(60) Provisional application No. 63/163,244, filed on Mar. 19, 2021.

(51) Int. Cl.
*G21C 17/00* (2006.01)
*G21C 17/017* (2006.01)

(56) References Cited

OTHER PUBLICATIONS

SuB, S. et al., "Test Methodology for Virtual Commissioning Based on Behaviour Simulation of Production Systems", 2016 IEEE 21st International Conference on Emerging Technologies and Factory Automation (ETFA), Berlin, Germany, Sep. 6-9, 2016 (Sep. 9, 2016).
Park, H-S et al., The Application of Visualization and Simulation in a Dismantling Process, Journal of Nuclear Science and Technology, vol. 44, No. 4, pp. 649-656, 2006.
Badler, N.I. et al., "Design Concepts for Automating Maintenance Instructions", University of Pennsylvania, Feb. 2000 (Feb. 2000).
Pedersen, M. M. et al., "Developing a Tool Point Control Scheme for a Hydraulic Crane Using Interactive Real-Time Dynamic Simulation", Modeling, Identification and Control, vol. 31, No. 4, 2010, pp. 133-143.
International Search Report, Canadian Intellectual Property Office, May 5, 2022.

* cited by examiner

SYSTEMS AND METHODS FOR SIMULATING AN OPERATION OF ONE OR MORE AUTOMATED TOOLS WITHIN A NUCLEAR FACILITY

CROSS-REFERENCE TO RELATED APPLICATIONS

This application is a continuation of International Application No. PCT/CA2022/050394 filed Mar. 16, 2021, which claims the benefit of U.S. Provisional Patent Application No. 63/163,244, filed Mar. 19, 2021. The entire contents of International Application No. PCT/CA2022/050394 and U.S. Provisional Patent Application No. 63/163,244 is hereby incorporated by reference for all purposes.

FIELD

The described embodiments relate to methods and systems associated with simulating machines, and in particular, to providing a simulation of an operation of one or more automated tools within a nuclear facility.

BACKGROUND

Facilities such as nuclear facilities may require work to be performed using a new tool (i.e., a tool that a human operator of the nuclear facility is not familiar with setting up and/or applying). This work may include, for example, decommissioning work or maintenance work.

Referring to FIG. 1, illustrated is an example of a nuclear reactor 100 (e.g., a CANada Deuterium Uranium reactor). The nuclear reactor 100 includes a plurality of calandria tubes 102 and a plurality of fuel channel pressure tubes 104. Towards the end of the lifecycle of the nuclear reactor, a major component replacement (MCR) can be performed on the nuclear reactor to extend its life. The MCR is not part of the regular operation of the nuclear facility, and may require tools (e.g., temporary tools and/or new tools) that are not generally used at the nuclear facility and/or kept in an position at the nuclear facility in which it may be applied to perform the work. For example, MCR may involve removal and replacement of all fuel channel pressure tubes 104 and calandria tubes 102. The tools may include cutting tools (e.g., cutters configured to cut metal) and other temporary tools, which may need to be set up in the nuclear faculty (e.g., within radiation protective zones) and/or applied to perform the work in the nuclear facility (e.g., within a radiation protective zone).

The tools are complex pieces of machinery. Operators (i.e., human operators) of the nuclear facility and/or of the tools may not be familiar with setting up the tools and/or applying the tools (e.g., because the work is not regularly and/or frequently performed). Accordingly, it can be difficult to operate the tools (e.g., set up the tools and/or apply the tools) effectively and/or efficiently. For example, setting up the tools may take a long period of time, requiring the operators to be in radiation protective zones, which may increase delays and/or radiation exposure for operators. Training the operators in the operation of the tools and/or having the operators operate the tools may involve further radiation exposure and/or delays.

SUMMARY

The various embodiments described herein generally relate to methods (and associated systems configured to implement the methods) for simulating an operation of one or more automated tools within a nuclear facility (e.g., a nuclear reactor).

According to some aspects, there is provided a system for simulating an operation of one or more automated tools within a nuclear facility, the system includes a communication component to provide access to one or more computing devices; one or more local controllers for processing command requests from the one or more computing devices for the one or more automated tools, the one or more local controllers generating process values for the one or more automated tools in response to the command requests; and a processor in communication with the communication component and the one or more local controllers. The processor can be operable to: use the process values to animate a three-dimensional model of the one or more automated tools operating within the nuclear facility; and generate one or more views of the animation of the three-dimensional model to be displayed at the one or more computing devices.

In some examples, the three-dimensional model of the one or more automated tools operating within the nuclear facility can be based on geometrical designs of the components and devices within the nuclear facility and the one or more automated tools.

In some examples, the processor can be operable to calculate motion of one or more parts in the three-dimensional model to animate the three-dimensional model.

In some examples, the processor can be operable to use stored data values for motion of one or more parts in the three-dimensional model to animate the three-dimensional model.

In some examples, the stored data values can be values that were obtained from a physical operation of the one or more automated tools.

In some examples, the command requests can be related to a series sequence of a plurality of series sequences, and animating the three-dimensional model comprises determining an order of operations between the one or more parts within the series sequence.

In some examples, the operations can include at least one of a motion of the one or more parts, a value of a sensor input, and a value of a sensor output of the components and devices in the nuclear facility and the one or more automated tools.

In some examples, the one or more parts can include a cylinder and the motion of the cylinder can be synchronized with real-time.

In some examples, the one or more parts can include a motor and the motion of the motor comprises at least one of acceleration, velocity, or deceleration.

In some examples, the value of a sensor output can include an analog distance value of at least one of a reference surface that is part of the nuclear facility; and the analog distance value is coupled to a position of a motor.

In some examples, the one or more automated tools can include at least one of a generic tool, a retube tooling carrier, a heavy work table, a retube tooling platform, and a vacuum system.

In some examples, the processor can be further operable to generate data corresponding to the animation to be used by a supervisory control and data acquisition system.

In some examples, the command requests can be received via the supervisory control and data acquisition system.

In some examples, the command requests can be further received from one or more control devices.

In some examples, a computing device at which the one or more views are displayed can be separate from at least one of the one or more computing devices from which the command requests are received.

In some examples, the command requests can be received from a plurality of computing devices. The plurality of computing devices can include a first area computing device for operating one or more automated tools in a first area of the nuclear facility and a second area computing device for operating one or more automated tools in a second area of the nuclear facility.

In some examples, the views of the animation generated for display at the first area computing device can correspond to a view from the first area of the nuclear facility and the views of the animation generated for display at the second area computing device can correspond to a view from the second area of the nuclear facility.

In some examples, the first area can be proximal to the second area such that the views of the animation generated for display at the first area computing device can reflect the operation of the one or more automated tools in the second area of the nuclear facility and the views of the animation generated for display at the second area computing device can reflect the operation of the one or more automated tools in the first area of the nuclear facility.

In some examples, the one or more computing devices at which the one or more views are displayed can be located in at least one of a control room or training room within the nuclear facility.

According to some aspects, there is provided a method for simulating an operation of one or more automated tools within a nuclear facility. The method can include using one or more local controllers for processing command requests received from one or more computing devices to generate process values for the one or more automated tools; and operating a processor in communication with the one or more local controllers and the one or more computing devices to: use the process values to animate a three-dimensional model of the one or more automated tools operating within the nuclear facility; and generate one or more views of the animation of the three-dimensional model to be displayed at one or more computing devices.

In some examples, the three-dimensional model of the one or more automated tools operating within the nuclear facility can be based on geometrical designs of the components and devices within the nuclear facility and the one or more automated tools.

In some examples, the processor can be operable to calculate motion of one or more parts in the three-dimensional model to animate the three-dimensional model.

In some examples, the processor can be operable to use stored data values for motion of one or more parts in the three-dimensional model to animate the three-dimensional model.

In some examples, the method can further involve, prior to animating the three-dimensional model, recording the stored data values during a physical operation of the one or more automated tools.

In some examples, the command requests can be related to a series sequence of a plurality of series sequences, and operating the processor to animate the three-dimensional model comprises operating the processor to determine an order of operations between the one or more parts within the series sequence.

In some examples, the operations can include at least one of a motion of the one or more parts, a value of a sensor input, and a value of a sensor output of the components and devices in the nuclear facility and the one or more automated tools.

In some examples, the one or more parts comprises a cylinder and the motion of the cylinder is synchronized with real-time.

In some examples, the one or more parts can include a motor and the motion of the motor comprises at least one of acceleration, velocity, or deceleration.

In some examples, the value of a sensor output can include an analog distance value of at least one of a reference surface that is part of the nuclear facility; and the analog distance value is coupled to a position of a motor.

In some examples, the one or more automated tools can include at least one of a generic tool, a retube tooling carrier, a heavy work table, a retube tooling platform, and a vacuum system.

In some examples, the method can further involve operating the processor to generate data corresponding to the animation to be used by a supervisory control and data acquisition system.

In some examples, the command requests can be received via the supervisory control and data acquisition system.

In some examples, the command requests can be further received from one or more control devices.

In some examples, a computing device at which the one or more views are displayed can be separate from at least one of the one or more computing devices from which the command requests are received.

In some examples, the command requests can be received from a plurality of computing devices. The plurality of computing devices can include a first area device for operating one or more automated tools in a first area of the nuclear facility and a second area device for operating one or more automated tools in a second area of the nuclear facility.

In some examples, the views of the animation generated for display at the first area computing device can correspond to a view from the first area of the nuclear facility and the views of the animation generated for display at the second area computing device can correspond to a view from the second area of the nuclear facility.

In some examples, the first area can be proximal to the second area such that views of the animation generated for display at the first area computing device can reflect the operation of the one or more automated tools in the second area of the nuclear facility and the views of the animation generated for display at the second area computing device can reflect the operation of the one or more automated tools in the first area of the nuclear facility.

In some examples, the one or more computing devices at which the one or more views can be displayed are located in at least one of a control room or training room within the nuclear facility.

BRIEF DESCRIPTION OF THE DRAWINGS

Several embodiments will now be described in detail with reference to the drawings, in which.

The drawings, described below, are provided for purposes of illustration, and not of limitation, of the aspects and features of various examples of embodiments described herein.

DESCRIPTION OF VARIOUS EMBODIMENTS

The various embodiments described herein generally relate to methods (and associated systems configured to implement the methods) for simulating an operation of one or more automated tools within a nuclear facility such as a nuclear reactor or a nuclear waste handling facility. In some examples, the various embodiments described herein generally relate to methods (and associated systems configured to implement the methods) for simulating an operation of one or more automated tools on a nuclear reactor.

Figures 1, 2:
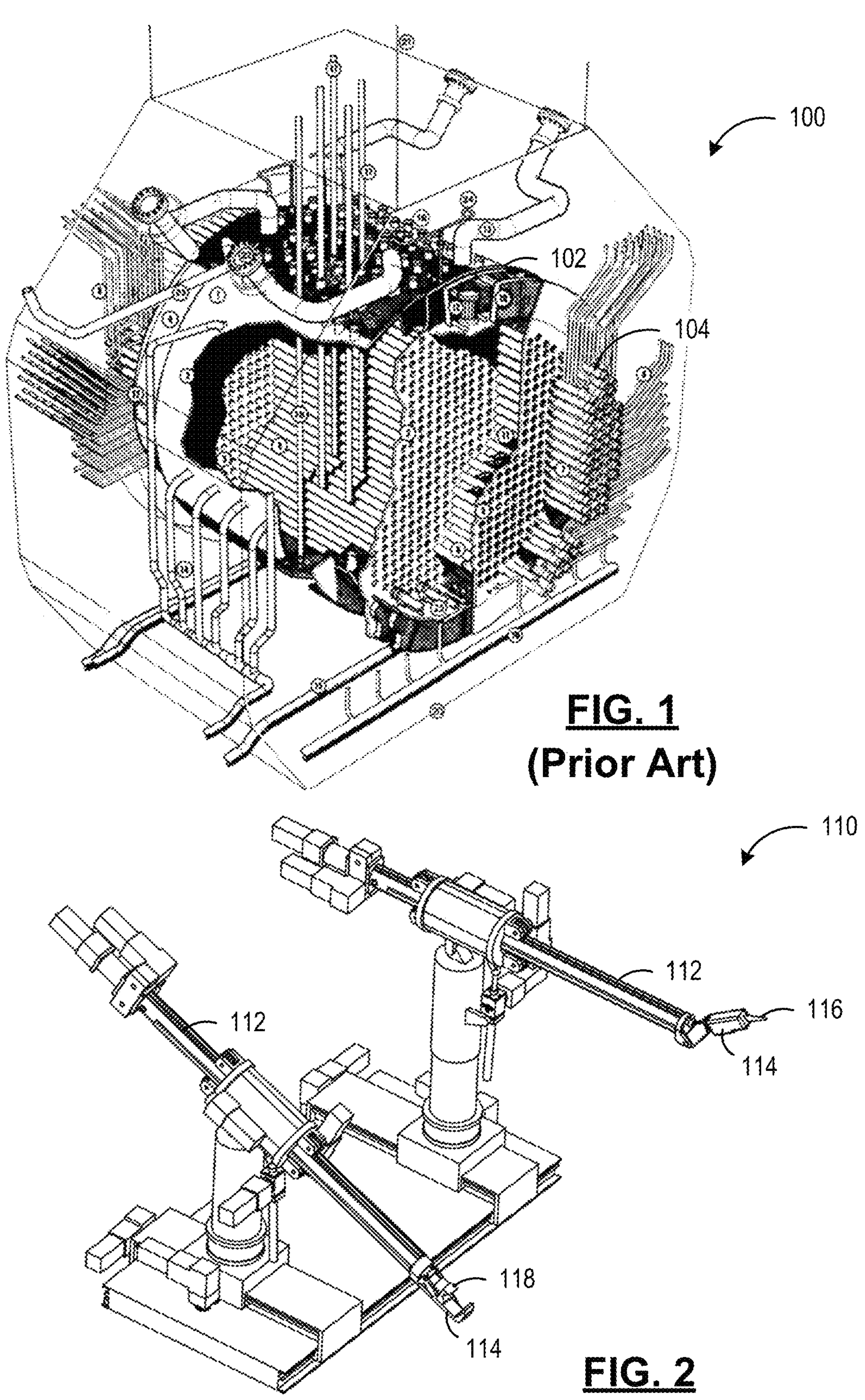
FIG. 1 is a perspective view of a nuclear reactor.
FIG. 2 is a perspective view of an example automated tool.

Referring to FIG. 2, illustrated is an example of a tool 110 for use in a nuclear facility. In the illustrated example, the tool 110 can be used to removing tubing from a nuclear reactor. The example tool 110 is a robotic platform that includes a pair of arms 112 each with an end effector 114, the end effectors including a cutter 116 for cutting tubing free and a gripper 118 for grasping the tubing to carry it away.

The example tool 110 is an automated tool (i.e., fully or partially automated), wherein the tool includes and/or the operations of the tool include the use of a programmable logic controller (PLC)). In some examples, an automated tool (i.e., fully or partially automated), such as the example tool 110, includes one or more programmable logic controllers (PLC). The PLC(s) may each be a digital computer that has been ruggedized and adapted for the control of industrial equipment (e.g., robotic platforms). The PLC(s) each accept one or more input(s) and generate one or more output(s).

Figures 3, 4:
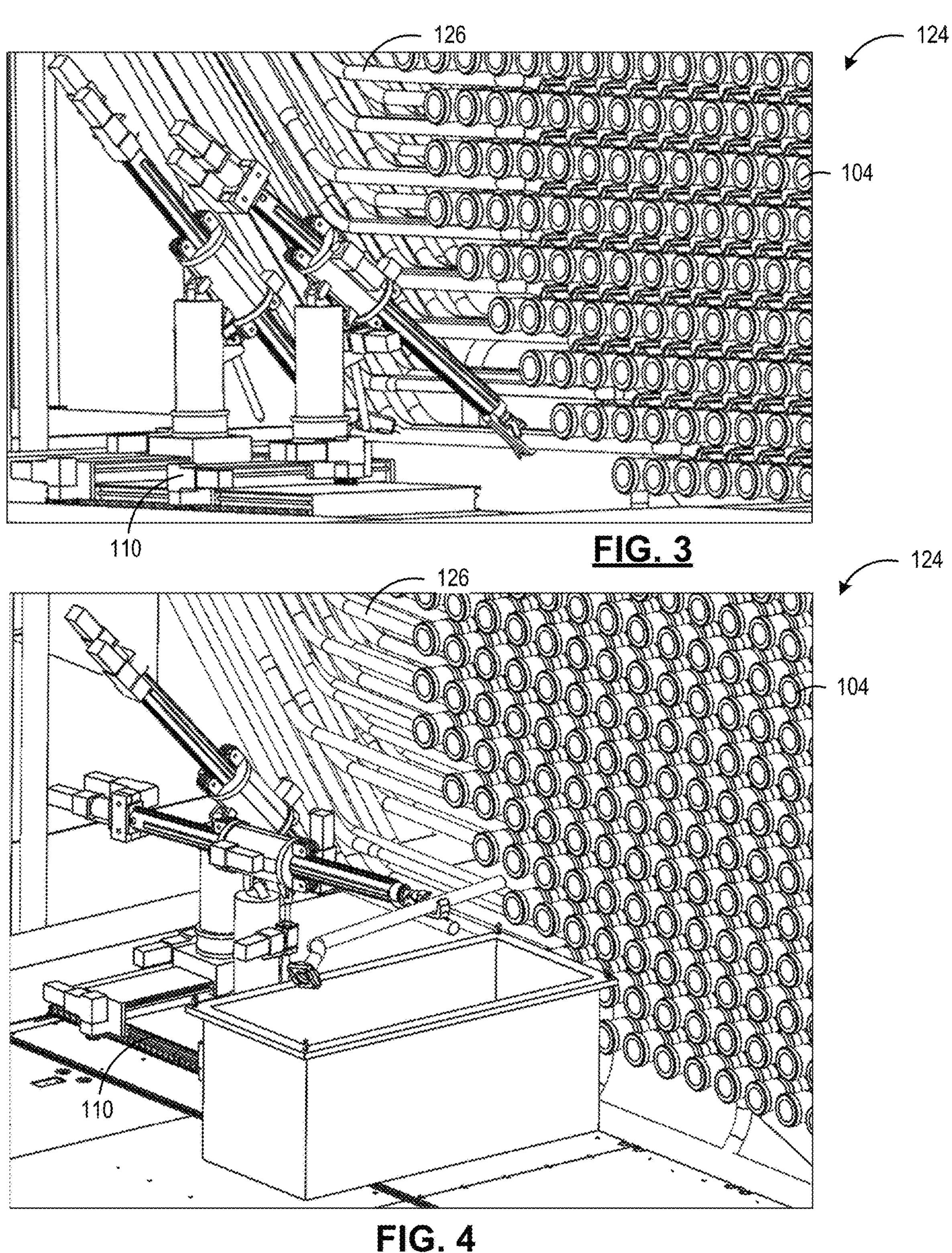
FIG. 3 is a perspective view of the automated tool of FIG. 2 in a first position adjacent a face of the nuclear reactor of FIG. 1.
FIG. 4 is a perspective view of the automated tool of FIG. 2 in a second position adjacent a face of the nuclear reactor of FIG. 1.

Referring now to FIG. 3 and FIG. 4, the example automated tool 110 is set up in front of a face 124 of the example nuclear reactor 100. Accordingly, the tool 110 may be applied to the nuclear reactor 100 (e.g., by cutting feeder tubes 126 free so they may be replaced).

The automated tool may be a generic cutting or handling tool (e.g., run by a generic tool control system (GTCS) and including a cutting apparatus and/or a gripping apparatus), a retube tooling carrier (RTC) operable to work overhead to remove material, a retube work platform (RWP) operable to provide vertical travel, a heavy worktable (HWT) operable to provide horizontal travel, and/or a vacuum system, including a radiation shielded storage chamber, operable to move radioactive particles into the shielded storage chamber.

Figure 5:
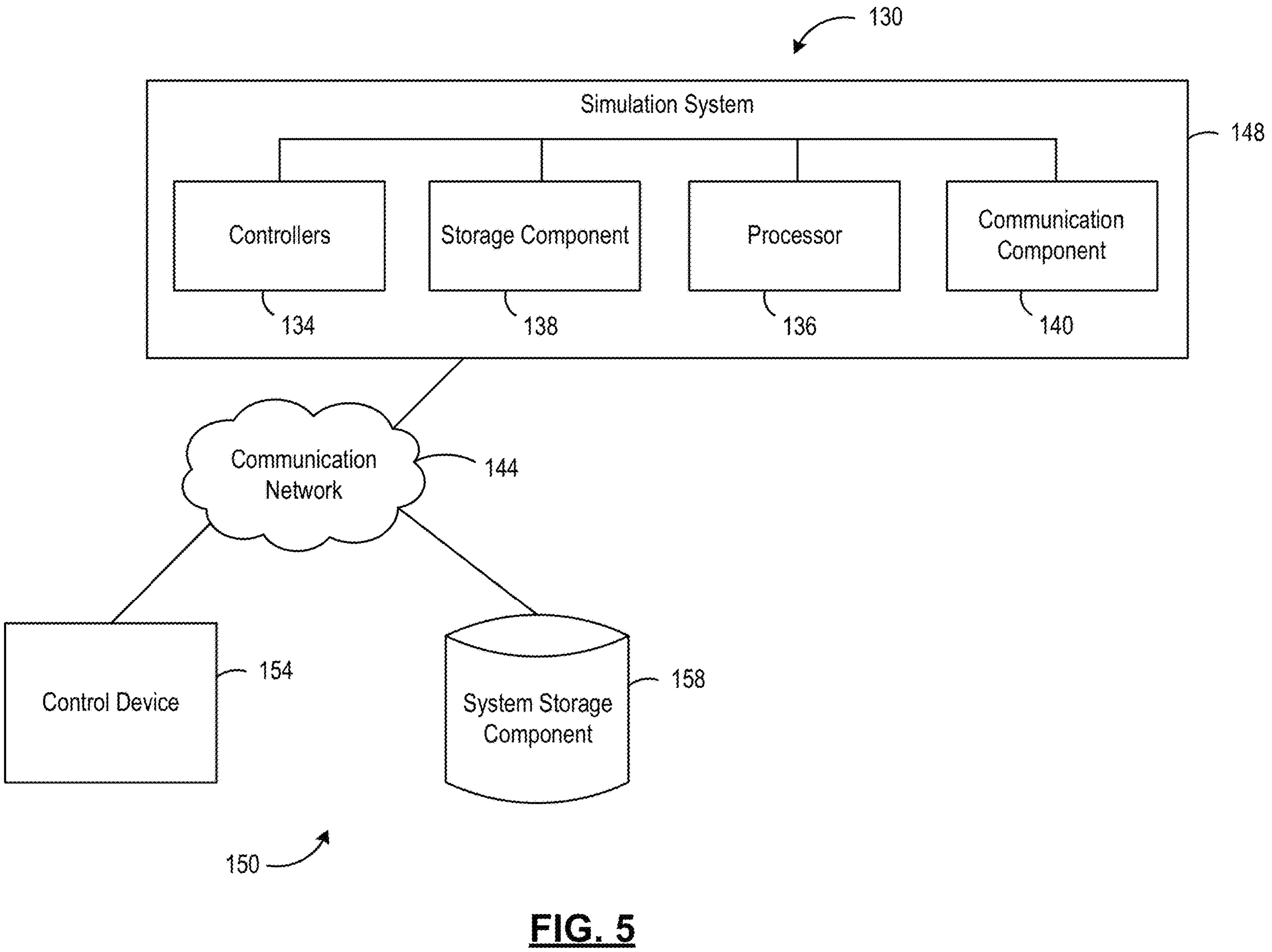
FIG. 5 is a schematic diagram of a first simulation system.

Referring now to FIG. 5, illustrated is an example system 130 for simulating an operation of an automated tool (e.g., a tool incorporating a PLC; partially or fully automated) in a nuclear facility. In some examples, the automated tool is a refurbishment or decommissioning tool (e.g., carrying a cutting apparatus), such as a refurbishment or decommissioning tool for use on a nuclear reactor.

In some examples, the system 130 is a digital twin system (i.e., the system 130 generates a virtual model of a corresponding physical system). The simulation system 130 generates a virtual model of the automated tool or of the automated tool and part or all of the nuclear facility, and animates the model using the output of one or more controller 134. The model (e.g., the three-dimensional model) of the one or more automated tools operating within the nuclear facility (e.g., on the nuclear reactor) is based on geometrical designs of the nuclear facility (e.g., of the nuclear reactor) and the one or more automated tools. Animating the model may include moving a part (e.g., a component or device of the automated tool and/or the nuclear facility) and/or receiving an output of a part (e.g., a sensor reading).

The controller 134 responds to command requests with process values as it would if it was communicatively coupled to the automated tool (i.e., generating process values for the one or more automated tools in response to the command requests). The use of controllers 134 may increase the accuracy of the simulation. In some examples, the controllers 134 of the simulation system 130 are configured identically to the controllers that are coupled to the physical automated tool to be operated in the nuclear facility.

The simulation system 130 also includes at least one processor 136 separate from the controller 134. The processor 136 is operable to receive the process values from the controller 134 and use the process values to animate a model (e.g., a three-dimensional model) of the automated tool or of the automated tool and the nuclear facility (part or all of the nuclear facility). For example, the simulation system 130 may include one or more storage device 138 storing the model (e.g., a model of a tool or a model of the tool and a face of a nuclear reactor), and the processor 136 may be operable to receive the model from the storage device 138 and receive the process values from the controller 134 and animate the model using the process values. The processor 136 is further operable to generate one or more views of the animation of the model. Views of the animation of the model may be used to train operators in the use of the automated tools.

The shape and/or scale of the virtual components and devices in the model may be accurate with respect to the corresponding physical components and devices. For example, the difference in size between the virtual automated tool and the virtual calandria may be the same as the difference in size between the physical automated tool and the physical calandria.

The processor 136 is operable to calculate the motion (e.g., acceleration, velocity, or deceleration) or other output of one or more virtual parts (e.g., components or devices of the tool or the nuclear facility, such as actuators or sensors) in the three-dimensional model. In some embodiments, instead of calculating the motion or other output of the virtual parts, the processor 136 can use stored data values for the corresponding one or more physical parts. The stored data values may be obtained from operation of the one or more physical parts (e.g., the motion of a virtual actuator may be the same as the motion of the physical actuator). For example, the motion of a physical tool in response to a command may be measured (e.g., motor output measured) and one or more value describing the motion may be stored. When the same command is issued in the simulation, the values taken from the motion of the physical tools may be used to simulate the motion of the virtual tool in the model. The parts may include but is not limited to actuators (e.g., a cylinder, such as but not limited to a pneumatic cylinder, a hydraulic cylinder, and/or a motor, such as but not limited to a servo motor, a stepper motor, an induction motor), and sensors (e.g., distance sensors, such as sensors of a distance between an end effector of a robotic arm and a workpiece of the nuclear facility, pressure transmitters, and/or load cells).

In some examples, the simulation system includes one or more series sequence (i.e., a series of animation steps that are tied together; an initial animation step and a set of consequential animation steps). Animating the model may include executing the series sequence in order. For example, a command may be for a cutter of an automated tool to cut a component within the nuclear facility while a gripper holds a portion of the component, and consequential animation steps may include having the component of the nuclear facility separate from the rest of the component (i.e., become a free piece) once the cutting operation is complete, such that the free portion is no longer attached to the rest of the component. Instead, the position of the free portion is determined by the forces of the gripper and gravity.

In some examples, the outputs of active virtual parts (e.g., sensor outputs or motion, such as data values taken from corresponding physical parts) are used to simulate the movement of one or more passive components. For example, a data value may include an analog distance value from a physical sensor to an end face sheet (e.g., a distance value that is coupled to a position of an active motor), a pressure tube sheet, a calandria tube sheet, an end-fitting, and/or thumbtacks of the nuclear reactor and may be used to simulate the end face sheet, the pressure tube sheet, the calandria tube sheet, the end-fitting, and/or the thumbtacks.

The controller 134 (e.g., one or more PLCs, such as a plurality of physical and/or virtual PLCs for hosting the PLC programs used in the tool) is included in the simulation system 130 for improved accuracy of the simulation. An accurate simulation may allow operators to become familiar with operating (e.g., setting up and/or applying the tool to perform the work) the automated tool, thereby decreasing the amount of time and/or radiation exposure resulting from the eventual physical operation of the automated tool in the nuclear facility.

The simulation system 130 also includes at least one communication component 140 (e.g., an Ethernet or an industrial field bus connection component) for communicating with external devices. The communications component 140 may include a wired or wireless communications link. The communications component 140 may be operable to communicatively couple the simulation system 130 with an external communications network 144 (e.g., the Internet). For example, the communications component 140 may include a wireless communications transceiver operable to send and/or receive wireless communications signals.

In some examples, the simulation system 130 is a localized system. In other words, the communications component 140, the at least one data storage device 138, the at least one processor 136, and the at least one controller 134 may each be adjacent to one another (e.g., within 100 kilometers, 10 kilometers, 1 kilometer, 10 meters, or 1 meter). In some examples, the simulation system 130 includes one or more housing 148, and the communications component 140, the at least one data storage device 138, the at least one processor 136, and the at least one controller 134 are housed within the one or more housing 148 (e.g., the simulation system 130 is provided as a simulation system console). A localized system may be more secure than a distributed system.

The communications component 140 may communicatively couple the simulation system 130 to one or more external devices 150. In some examples, the simulation system 130 uses one or more external storage devices 158 in addition to, or in alternative to, using one or more local storage devices 138.

In some examples, the one or more external device 150 includes one or more control device 154. The control device 154 is a device at which the operator enters or otherwise generates command requests. For example, the control device 154 may be a computing device via which the operator is able to generate one or more of a plurality of different possible commands (e.g., the operator can choose one or more of more than 5, more than 10, more than 20, or more than 50 possible commands) or a simpler device such as a pendant control (e.g., a simple device via which the operator can choose from less than 20, less than 10, or less than 5 possible commands, such as a pendant with 2 to 4 buttons each of which may be used to generate a unique command). The command requests may be transferred to the simulation system 130 via the communications component 140 (e.g., through the communications network 144 and the communications component 140).

The external control device 154 may be a plurality of devices 154. In some examples, the external control device 154 includes at least one device 154 for generating commands for parts at a first portion of the model and at least one other device 154 for generating commands for parts at a second portion of the model. For example, the nuclear facility may include a first area (e.g., east face of a nuclear reactor) and at least one first device 154 may control at least one automated tool that is in the first area (e.g., in position adjacent the first face to be applied to the first face, or within 100 meters, 10 meters, 5 meters, or 1 meter of the first face) and a second area (e.g., west face of the nuclear reactor) and at least one second device 154 may control at least one automated tool that is in the second area.

In some examples, where the control device 154 is a plurality of devices 154, the processor 136 may generate a plurality of views of the model or the animated model, and at least one control device 154 may be linked to a different view than at least one other control device 154. For example, the processor 136 may generate a first view showing the first area and a second view showing the second area, such that the operator of the first device 154 can watch the first view and the operator of the second device 154 can watch the second view. The visibility of tools can be dependent on the series sequence and/or area being viewed.

In some examples, the first area and the second area can be proximal such that the first area can be visible in the views of the animation generated for display at the second area and the second area can be visible in the views of the animation generated for display at the first area. That is, both the first view and the second view can show a same component but from different angles. Furthermore, both the first view and the second view can show the operation of an animated tool from different angles.

The processor 136 may communicate the animated model and/or the view(s) of the animated model to an external device via the communication component 140. For example, the processor 136 may communicate the animated model and/or the view(s) of the animated model to the same computing device(s) 154 used to generate the command request or another computing device(s). The display device to which the model, animated model, and/or view(s) are sent to be displayed may be located in a control room or training room within the nuclear facility, and may be located in the control room or training room along with the control device 154 (i.e., regardless of whether the display device is the same device as the control device 154). In some examples, the training room can be off-site from the nuclear facility.

Use of the simulation system 130 can permit training of operators without installing the tool in the nuclear facility (e.g., install the tool in the chamber from which the calandria is accessible), without commissioning the tool and dealing with anticipated issues (e.g., repair a missing or broken tool component), resets between operations, and/or remove the tool from the nuclear facility (e.g., remove the tool from the chamber from which the calandria is accessible). The simulation system 130 can be easily reset after use, greatly reducing the time required to reconfigure an automated tool between training sessions (e.g., down from more than an hour to a few minutes) and increasing the number of training cycles an operator can participate in.

Figure 6:
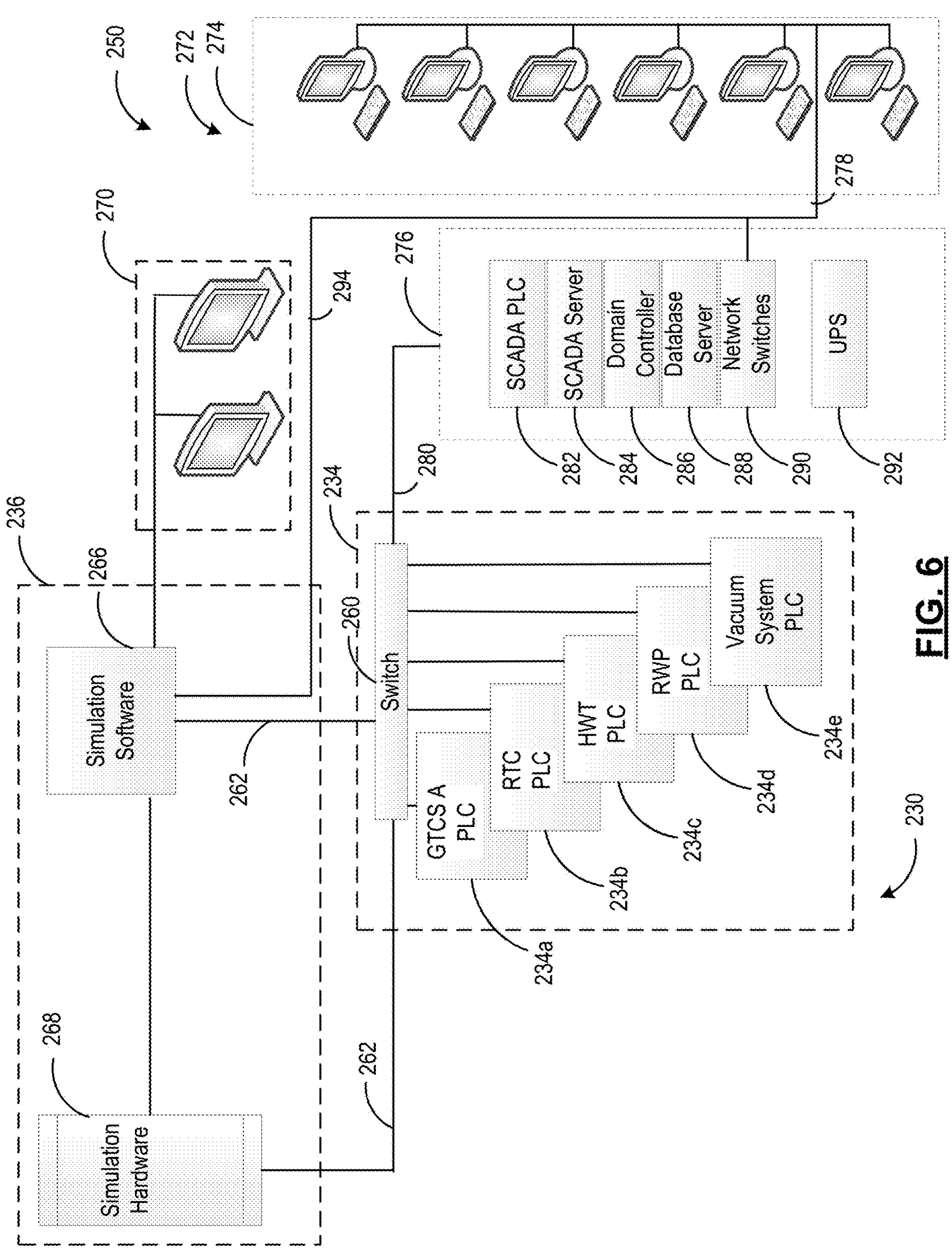
FIG. 6 is a schematic diagram of a second simulation system.

Referring now to FIG. 6, illustrated is another example system 230 for simulating an operation of an automated tool. The system 230 is similar in many respects to the system 130, and like features are indicated with like reference numbers incremented by 100.

The system 230 includes a plurality of controllers 234. The controllers 234 are PLCs, and may include one or more PLC 234*a* for a generic tool control system (GTCS), one or more PLC 234*b* for a retube tooling carrier (RTC) operable to work overhead to remove material, one or more PLC 234*c* for a heavy worktable (HWT), one or more PLC 234*d* for a retube work platform (RWP), and/or one or more PLC 234*e* for a vacuum system.

The controllers 234 are communicatively coupled (e.g., via a switch 260 and communications links 262) to at least one processor 236. The processor 236 is operable to generate and/or animate a model of the automated tool or the automated tool and the nuclear facility (e.g., part or all of the nuclear facility). In the illustrated example, the processor 236 includes simulation software 266, such as but not limited to simulation software that generates the three-dimensional, kinematically linked model (e.g., YAMs™ simulation software from EKS Intec GmbH™) and visualization software to display the results of the three-dimensional, kinematically linked model and simulation hardware 268, such as but not limited to an RF::FSBox™ from EKS Intec GmbH™. The simulation hardware 268 can be communicatively coupled to the simulation software 266 via a dedicated communication network, such as but not limited to ethernet cable. The processor 236 is also coupled (e.g., via an HDMI™ or DisplayPort™ connection) to one or more displays 270 (e.g., screens such as computer monitors, virtual reality screens or augmented reality screens) to communicate the model, the animated model, and/or a view of the model or animated model to the display 270. The processor 236 may be operable to run a visualization software (e.g., the Viper application from EKS Intec GmbH, which may contain the functions and code that react to the outputs and commands coming to the physical PLCs to control the progress of the simulation). In some examples, the processor 236 is operable to generate at least one view of each face of the nuclear reactor in the model or animated model.

One or more external control device 250 is communicatively coupled to the controllers 234. The external control device 250 may include at least one computing device 272 which may include one or more operator workstation 274 and at least one supervisory control and data acquisition 276 (SCADA), as in the illustrated example. However, in some examples, the external control device 250 is a simpler control device, such as a pendant control device that may be used to generate commands for the PLC(s).

Where a computing device is included, an operator may generate a command request using the external computing device 272 by, e.g., entering a direction in the workstation 274 to control the SCADA 276 via a first communications link 278 to send a command request to the controller 234 via a second communications link 280. In some examples, the SCADA 276 and/or the workstation 274 are in a common physical external computing device console (e.g., having a housing or frame in or to which they are mounted). In some examples, the external computing device console is separate from a physical console containing the processor 236, the controller 234, and/or the display 270 (e.g., a first console may include the workstation 274 and/or the SCADA 276 while a second console includes the controller 234, the processor 236, and/or the display 270).

As in the illustrated example, the SCADA 276 may include a SCADA PLC 282, a SCADA server 284, a domain controller 286, a database server 288, network switches 290, and/or an uninterruptible power system 292 (UPS). In some examples, the processor 236 is communicatively coupled (e.g., via the third communications link 294) to the SCADA 276 to, e.g., provide data to the SCADA 276 in further generating commands for the controllers 234.

Figure 7:
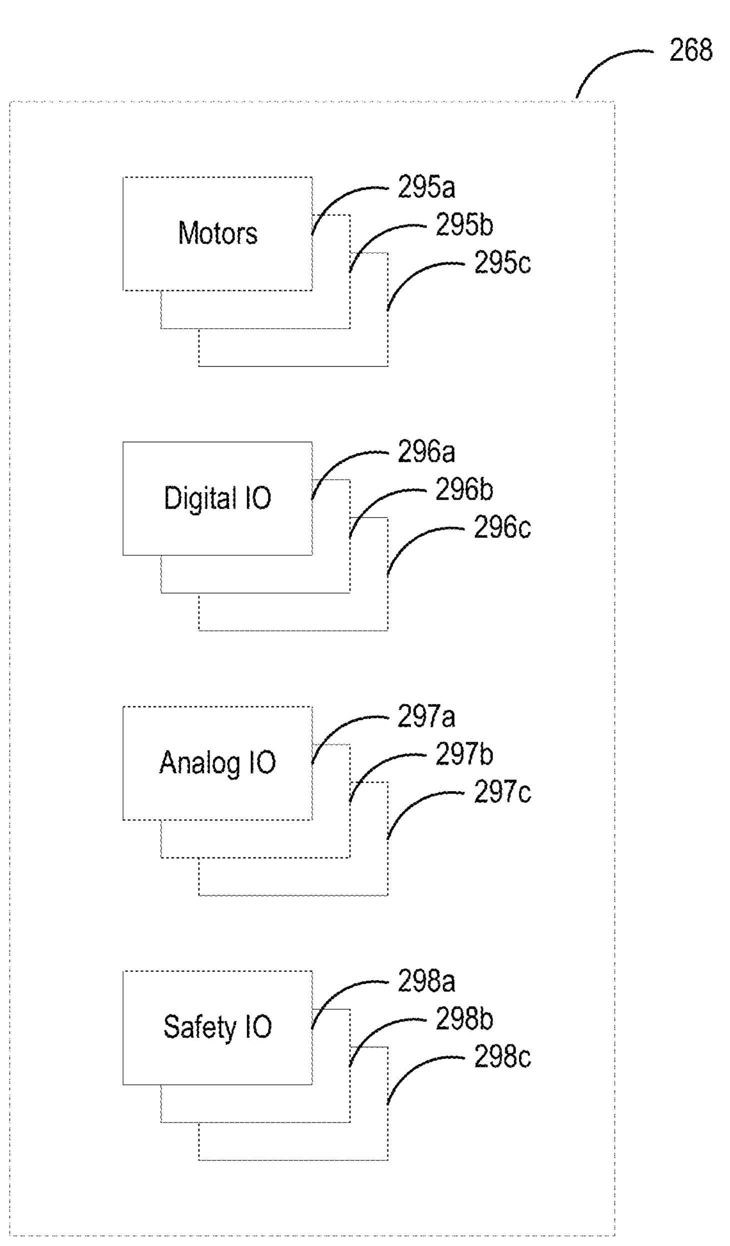
FIG. 7 is a schematic diagram of a portion of the second simulation system of FIG. 6.

Referring now to FIG. 7, the processor 236 (e.g., the RF::FSBox Sim HW™ 268 from EKS Intec GmbH™) may simulate one or more motors 295 (e.g., a plurality such as between 10 and 60, between 20 and 30, or about 40 motors), one or more digital inputs and/or outputs 296, one or more analog inputs and/or outputs 297, and one or more safety inputs and/or outputs 298 of the automated tools and/or facility (e.g., nuclear facility).

Figure 8:
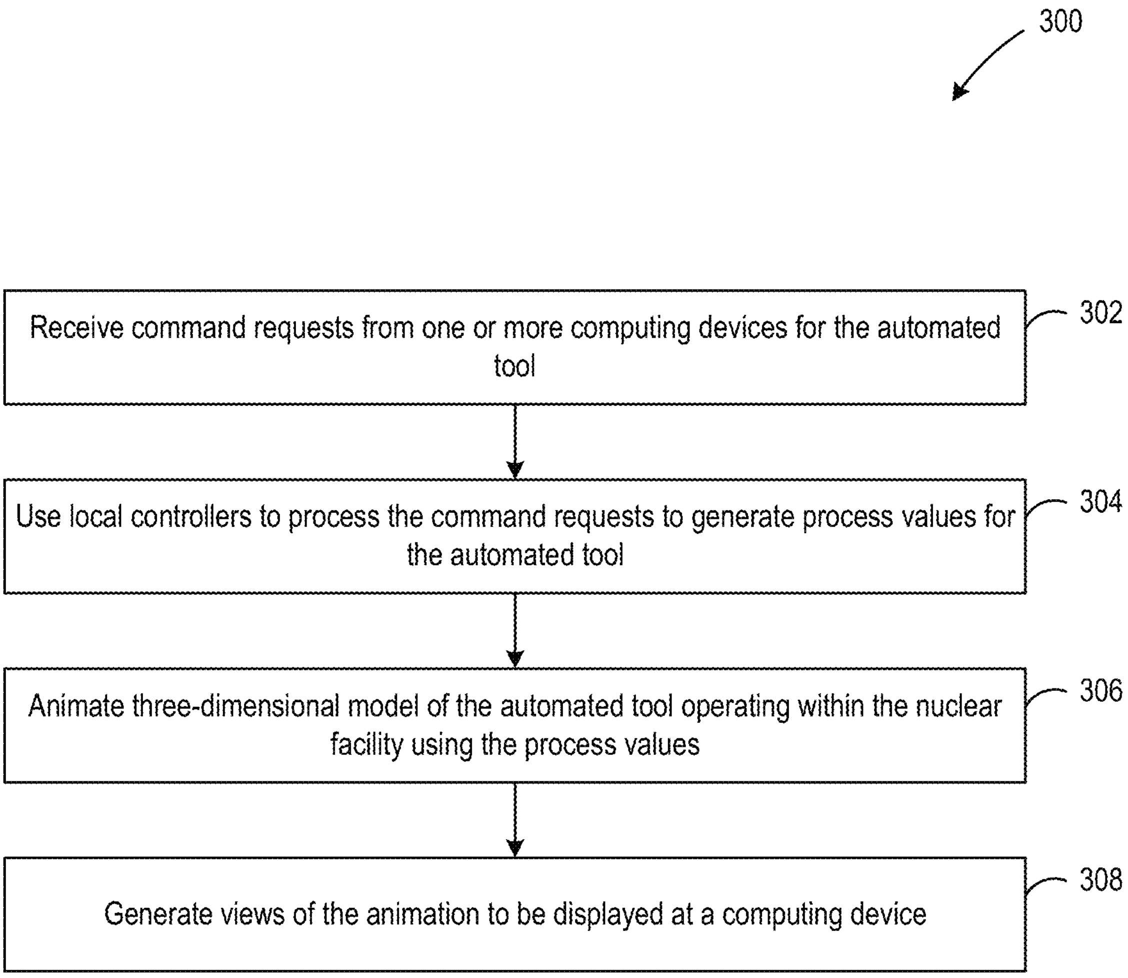
FIG. 8 is a flow diagram of a method for simulating an operation of one or more automated tools.

Referring now to FIG. 8, illustrated is a method 300 for simulating an operation of one or more automated tools in a nuclear facility (e.g., operation of one or more automated tools on a nuclear reactor). The method 300 may include, at step 302, receiving one or more command requests for one or more automated tools from one or more computing devices. At step 304, the method includes using one or more local controllers for processing command requests received from one or more computing devices to generate process values for the one or more automated tools.

The method also includes, at step 306, operating a processor in communication with the one or more local controllers and the one or more computing devices to use the process values to animate a three-dimensional model of the one or more automated tools operating within a nuclear facility (e.g., operation of one or more automated tools on the nuclear reactor as in the illustrated example). At step 308, the method includes operating a processor in communication with the one or more local controllers and the one or more computing devices to generate one or more views of the animation of the three-dimensional model to be displayed at one or more computing devices.

For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

It should be noted that terms of degree such as “substantially”, “about” and “approximately” when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

For example, and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments. Also, in the various user interfaces illustrated in the drawings, it will be understood that the illustrated user interface text and controls are provided as examples only and are not meant to be limiting. Other suitable user interface elements may be possible.

The invention claimed is:

1. A system for simulating an operation of one or more automated refurbishment or decommissioning tools within a nuclear facility, the system comprising:

a) a communication component to provide access to one or more computing devices;

b) one or more local controllers comprising programmable logic controllers for processing command requests from the one or more computing devices for the one or more automated refurbishment or decommissioning tools, the one or more local controllers generating process values for the one or more automated refurbishment or decommissioning tools in response to the command requests, wherein the one or more local controllers are similarly configured to controllers coupled to physical automated refurbishment or decommissioning tools, and wherein the process values generated by the one or more local controllers correspond to process values that would be generated by the controllers coupled to the physical automated refurbishment or decommissioning tools in response to the command requests; and c) a processor separate from and in communication with the communication component and the one or more local controllers, the processor being configured to receive the process values from the one or more local controllers and being operable to:

i. use the process values received from the one or more local controllers to animate a three-dimensional model of the one or more automated refurbishment or decommissioning tools operating within the nuclear facility; and ii. generate one or more views of the animation of the three-dimensional model to be displayed at the one or more computing devices.

2. The system of claim 1, wherein the three-dimensional model of the one or more automated tools operating within the nuclear facility is based on geometrical designs of the components and devices within the nuclear facility and the one or more automated tools.

3. The system of claim 1, wherein the processor is operable to calculate motion of one or more parts in the three-dimensional model to animate the three-dimensional model.

4. The system of claim 1, wherein the processor is operable to use stored data values for motion of one or more parts in the three-dimensional model to animate the three-dimensional model.

5. The system of claim 4, wherein the stored data values are values that were obtained from a physical operation of the one or more automated refurbishment or decommissioning tools.

6. The system of claim 2, wherein the command requests are related to a series sequence of a plurality of series sequences, and animating the three-dimensional model comprises determining an order of operations between the one or more parts within the series sequence.

7. The system of claim 6, wherein the operations comprise at least one of a motion of the one or more parts, a value of a sensor input, and a value of a sensor output of the components and devices in the nuclear facility and the one or more automated tools.

8. The system of claim 7, wherein the one or more parts comprises a cylinder and the motion of the cylinder is synchronized real-time.

9. The system of claim 7, wherein the one or more parts comprises a motor and the motion of the motor comprises at least one of acceleration, velocity, or deceleration.

10. The system of claim 7, wherein the value of a sensor output comprises an analog distance value of at least one of a reference surface that is part of the nuclear facility; and the analog distance value is coupled to a position of a motor.

11. The system of claim 1, wherein the one or more automated tools comprises at least one of a generic tool, a retube tooling carrier, a heavy work table, a retube tooling platform, and a vacuum system.

12. The system of claim 1, wherein the processor is further operable to generate data corresponding to the animation to be used by a supervisory control and data acquisition system.

13. The system of claim 12, wherein the command requests are received via the supervisory control and data acquisition system.

14. The system of claim 1, wherein the command requests are further received from one or more control devices.

15. The system of claim 1, wherein a second computing device at which the one or more views are displayed is separate from at least one of the one or more computing devices from which the command requests are received.

16. The system of claim 1, wherein the command requests are received from a plurality of computing devices, the plurality of computing devices comprising a first area computing device for operating one or more automated tools in a first area of the nuclear facility and a second area computing device for operating one or more automated tools in a second area of the nuclear facility.

17. The system of claim 16, wherein the views of the animation generated for display at the first area computing device correspond to a view from the first area of the nuclear facility and the views of the animation generated for display at the second area computing device correspond to a view from the second area of the nuclear facility.

18. The system of claim 17, wherein the first area is proximal to the second area such that the views of the animation generated for display at the first area computing device reflect the operation of the one or more automated tools in the second area of the nuclear facility and the views of the animation generated for display at the second area computing device reflect the operation of the one or more automated tools in the first area of the nuclear facility.

19. The system of claim 1, wherein the one or more computing devices at which the one or more views are displayed are located in at least one of a control room or training room within the nuclear facility.

20. A method for simulating an operation of one or more automated refurbishment or decommissioning tools within a nuclear facility, the method comprising:

a) using one or more local controllers comprising programmable logic controllers for processing command requests received from one or more computing devices to generate process values for the one or more automated refurbishment or decommissioning tools, wherein the one or more local controllers are similarly configured to controllers coupled to physical automated refurbishment or decommissioning tools, and wherein the process values generated by the one or more local controllers correspond to process values that would be generated by the controllers coupled to the physical automated refurbishment or decommissioning tools in response to the command requests; and b) operating a processor separate from and in communication with the one or more local controllers and the one or more computing devices, the processor being configured to receive the process values from the one or more local controllers, to:

i. use the process values received from the one or more local controllers to animate a three-dimensional model of the one or more automated refurbishment or decommissioning tools operating within the nuclear facility, and ii. generate one or more views of the animation of the three-dimensional model to be displayed at one or more computing devices.

* * * * *